United States Patent
Jones et al.

[11] Patent Number: 5,235,137
[45] Date of Patent: Aug. 10, 1993

[54] BUOYANT CABLE

[75] Inventors: Idwal D. L. Jones, Cardiff; Granville Lawrence, Newport, both of Wales; Robert Waters, Usk, United Kingdom

[73] Assignee: Northern Telecom Limited, Montreal, Canada

[21] Appl. No.: 737,242

[22] Filed: Jul. 29, 1991

[30] Foreign Application Priority Data

Aug. 16, 1990 [GB] United Kingdom ............ 9017952

[51] Int. Cl.⁵ .............................................. H01B 7/12
[52] U.S. Cl. ........................ 174/101.5; 174/70 R; 174/70 S; 174/74 R; 174/126.1; 174/128.2; 174/131 R
[58] Field of Search ............... 174/101.5, 70 R, 70 S, 174/74 R, 126.1, 128.1, 128.2, 131 R; 367/106, 130

[56] References Cited

U.S. PATENT DOCUMENTS

| | | | |
|---|---|---|---|
| 1,980,363 | 11/1934 | Staples | 174/131 R |
| 1,984,554 | 12/1934 | Staples | 174/131 R |
| 2,046,978 | 7/1936 | Staples | 174/128.1 |
| 2,396,268 | 3/1946 | Jones | 174/101.5 |
| 3,155,768 | 11/1964 | Garshick | 174/101.5 |
| 3,483,313 | 12/1969 | Schaffhauser | 174/101.5 |
| 4,399,322 | 8/1983 | Hafner, Jr. | 174/101.5 |
| 4,437,097 | 3/1984 | Hudson | 174/101.5 X |
| 4,963,420 | 10/1990 | Jarrin et al. | 174/28 X |

*Primary Examiner*—Morris H. Nimmo
*Attorney, Agent, or Firm*—Lee, Mann, Smith, McWilliams, Sweeney & Ohlson

[57] ABSTRACT

A buoyant cable, particular for magnetic minesweeping applications, comprising a bundle of electrically conductive tubes (1) with an overall electrically-insulating sheath (4), the tubes providing buoyancy, strength and electrical conductivity for the cable. The sheath may have an internal reinforcing braid.

11 Claims, 2 Drawing Sheets

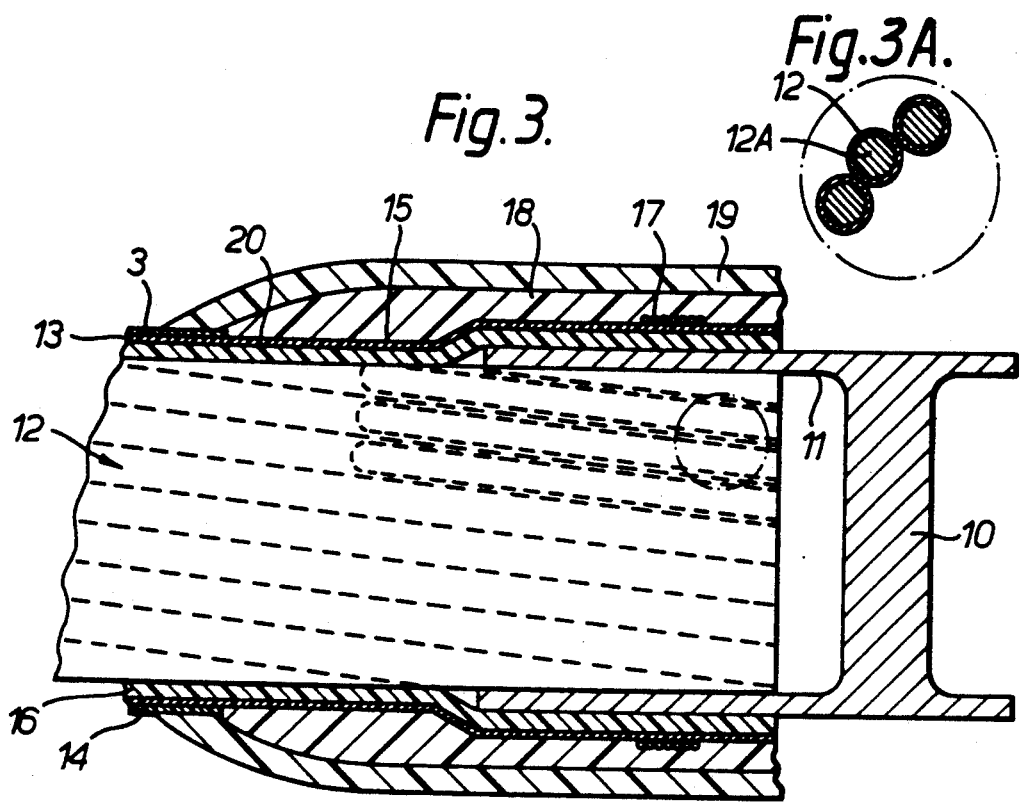
Fig. 3.
Fig. 3A.
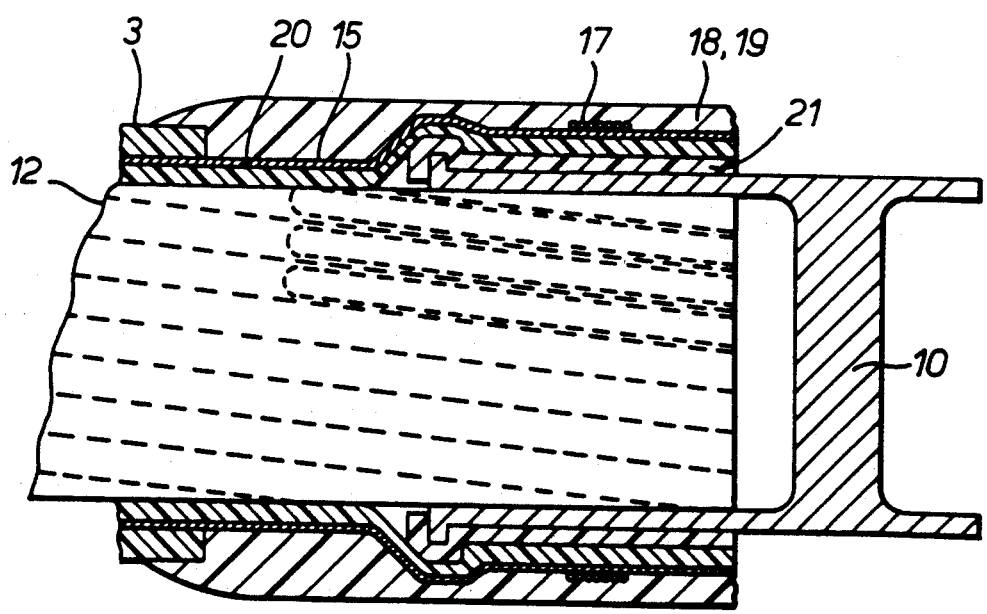
Fig. 4.

BUOYANT CABLE

BACKGROUND OF THE INVENTION

This invention relates to buoyant cable structures and in particular to cable structures which are buoyant in water and terminations therefor. Traditionally to achieve cable buoyancy in water, such as for towed cables for magnetic mine sweeping applications, a buoyancy layer is included in the cable structure. In addition such cables need to be flexible for winch handling purposes as well as having a specific weight per unit length and including strength members and electrical conductors. Current of the order of 2500–3000A but at only of the order of hundreds of volts is passed through the conductors in order to produce the required magnetic field for minesweeping. The construction of a conventional minesweeping cable has a central float or buoyancy section made up of cork and wood sections which are joined together end to end to provide a flexible structure. The electrical conductors may comprise two layers of aluminium wires disposed over the central buoyancy section. This is sheathed with, for example, neoprene. Any joints between the aluminium wires of separate cable sections (connections) and terminations are sheathed with natural rubber and then the neoprene. Using discrete elements to achieve some or all of the required features (strength, conductivity and buoyancy) of necessity results in a large diameter cable with attendant handling and storage problems.

SUMMARY OF THE INVENTION

According to the present invention there is provided a buoyant cable including a bundle of un-insulated electrical conductors substantially comprised by tubes of electrically conductive material, the bundle having an electrically-insulating sheath thereover, the tubes providing buoyancy, strength and electrical conductivity for the cable.

BRIEF DESCRIPTION OF THE DRAWINGS

Embodiments of the invention will now be described with reference to the accompanying drawings, in which:

FIGS. 3 and 4 show, respectively, end terminations applied to two variants of the cable of FIG. 2.

DESCRIPTION OF THE PREFERRED EMBODIMENTS

Figure 1:
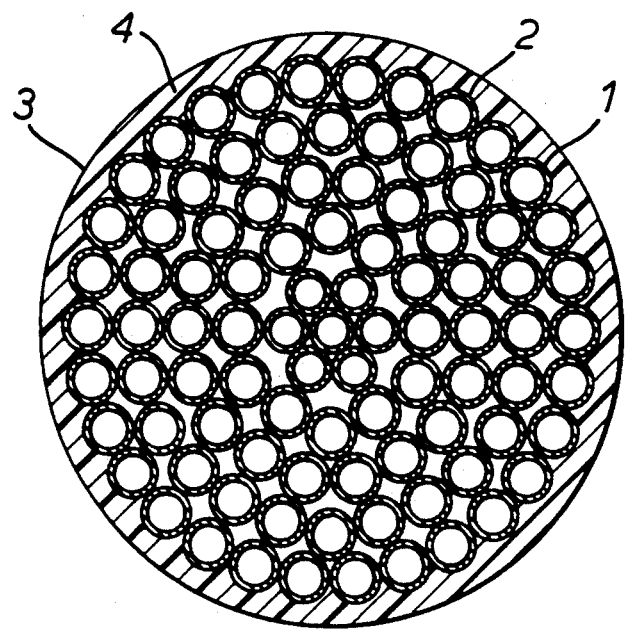
FIG. 1 illustrates a cross-section through a first embodiment of cable.

The present invention is based on the recognition that all of the required basic features (strength, conductivity and buoyancy) can be provided by just one type of element, specifically an elongate hollow electrical conductor or tube 1(FIG. 1), a number of such tubes (individually un-insulated) being laid-up together in a bundle to form the electrical conductor 2 of cable 3. The overall conductor 2 is provided with insulation in the form of a sheath 4 which may comprise an extruded polyethylene or thermoplastic elastomer (rubber) layer and which also provides protection from the surrounding environment. The sheath material is preferably a buoyant material. The specific design of the tubes 1 is based on the required cross-section area to give a predetermined conductivity and current carrying capacity as well as required weight per unit length. The wall thickness of the tube is selected to realise the hoop strength necessary to resist collapse due to external pressures, such as water pressure, or within cable stresses. As will be appreciated, the spaces within the tubes will provide buoyancy when filled with an appropriate medium, in particular air. Air in the interstices between the tubes can also contribute to buoyancy. A preferred material for the tube is an aluminium alloy, since this can be such as to provide a suitable compromise between the general requirements of good conductivity, high strength and low weight. In certain applications aluminium or copper may however be usable.

In order to ensure buoyancy the spaces within the tubes will need to be reliably sealed at the ends thereof. This can be achieved by inserting solid rods (not shown) of the same material as the tubes into the ends and crimping the tube onto the rod. This can form part of the operation to affix an end termination element 10 (FIGS. 3 and 4) to the cable 3. Two variants of the termination technique will be described hereinafter with respect to FIGS. 3 and 4. Each tube is preferably substantially neutrally buoyant so that the cable will float even if the sheath is breached.

An example of the cable described with reference to FIG. 1 has a conductor which comprises 91, 5 mm OD, 4 mm ID, tubes of aluminium alloy and has an outer sheath of thermoplastic rubber with a wall thickness of 3 mm (nominal). The tubes are laid up in layers about a central tube with some layers having opposite lay in order that the overall structure is torsionally balanced. Some or all of the layers may be held in place by whipping threads during the tube laying up, particularly if the machinery is not able to lay up all layers in one pass. The cable of FIG. 1 has an overall diameter of the order of 60 mm in comparison with the 78 mm of a conventional minesweeping cable. Thus the inventive cable is of the order of 20% smaller and this results in improved handleability, in particular increased storage efficiency when reeled up.

The cable sheath may be subjected to considerable damage in handling but there are various ways of increasing the sheath toughness. This could be achieved by using a tougher sheath material if one with superior qualities was forthcoming. Whilst simply increasing the sheath thickness will result in a tougher sheath, this would increase the thermal resistance of the sheath, reduce the current rating and hence necessitate more conductor material to maintain a particular current rating. More conductor material could be provided by an extra layer of tubes or replacing some of the tubes by solid rods of aluminium. In general, however, the conductor material is substantially comprised by tubes.

An alternative way to toughen the sheath is for it to comprise two extruded sheathing layers 6, 7 (FIG. 2) with a textile braid 8 sandwiched therebetween. Provided the braid is sufficiently open in structure the outer sheath 7 can be bonded to the inner sheath 6. The braid could be of an aramid fiber, such a KEVLAR. Such a textile braid would provide a degree of cut-through resistance and increase tear resistance. However, the sheath thus formed would be thicker than otherwise, for example, layer 6 having a wall thickness of 2.5 mm (nominal) and layer 7, 3 mm (nominal), the overall thickness thus being 5.5 mm, with subsequent reduction in cable current rating unless some of the tubes are replaced by rods, such as 1' (FIG. 2), or a larger tube bundle is employed and hence an even larger cable results.

Instead of a textile braid, a metallic wire or ribbon braid could be used. This would increase the cut-through resistance of the sheath but unfortunately would also increase the cable weight with the result that more buoyancy would need to be provided, and hence a larger cable diameter results. Additionally since the metallic braid will have to be isolated from the conductor at the terminations this will result in more complex terminations. In order not to interfere with the magnetic performance of the cable the metallic braid should be of a non-ferromagnetic material and of minimum weight compatible with protection it provides. Aluminium ribbon braid is a possible material. Titanium, for its strength and relative light weight, phosphor bronze for its strength, and non-magnetic stainless steel, are possible alternative non-magnetic materials, but when they are used in place of aluminium as a ribbon braid they render the cable more dense, requiring increased buoyancy and increasing the diameter again. Modification of the sheath material can be made in order to increase its flexibility and reduce the cable stiffness. The cable stiffness could also be reduced by increasing the lay angle of the tubes from the present approximately 15°, but not above 25°-27°. The braid reinforcing could, with careful design, be used to increase the cable tensile strength at the termination and consequently the overall cable strength as well as increasing the cut-through resistance of the cable. The sheath itself is preferably of buoyant material even if reinforced.

Figure 2:
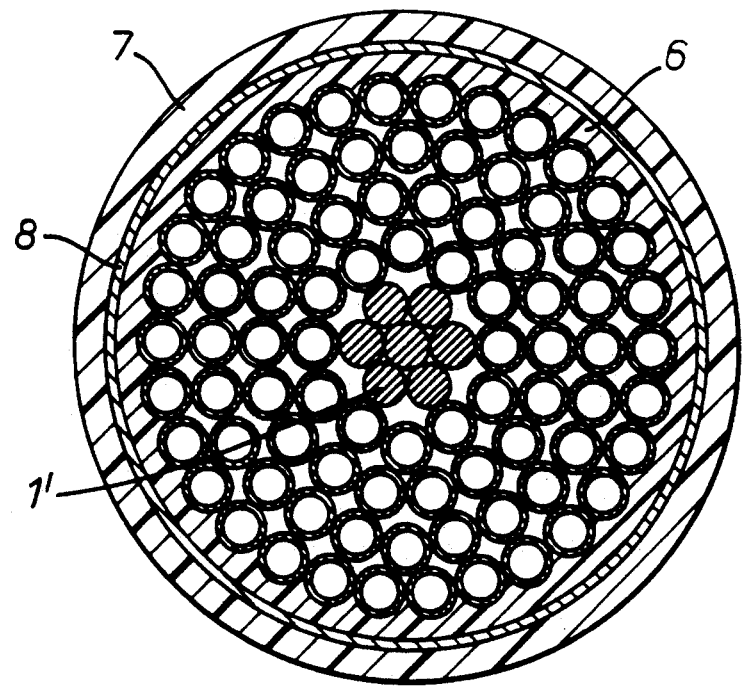
FIG. 2 illustrates a cross-section through a second embodiment of cable.

The cable terminations used with the cables having tubular conductors as described with reference to FIGS. 1 and 2 must be such that a reliable interface is maintained at all times with the cable. The termination of a reelable cable usually has a weak point at the transition of the flexible cable to the rigid section. The termination length should thus be as short as possible and its outside diameter should be similar to the cable outside diameter. The termination method must also ensure that the mechanical loads induced in the cable are efficiently transferred into other cables. At the same time the primary objective of the termination is to conduct the high current within the cable conductor to other cable conductors without affecting performance. Furthermore the termination is required to be capable of being made watertight. The termination is also required not to affect the buoyancy of the cable greatly.

The termination system shown in FIG. 3 for the non-metallic braid reinforced sheath cable comprises an aluminium or aluminium alloy termination element 10 having a bore 11 into which the bared conductor bundle of tubes 12 is inserted following the insertion of solid rods 12A into the end of the tubes. This is followed by crimping of the element 10 onto tubes 12, which crimping can serve also to crimp the tubes to the plugging rods, rather than achieving that in a separate operation. The sheath 13 has two layers 14 and 16. The sheath layer 16 under the braid 15 and the braid 15 extends over the respective end of element 10 and is held in place by a whipping 17. Part of the sheath layer 14 is removed to expose the braid 15. A water blocking compound may be applied at 20 over the exposed braid and over the whipping. A self amalgamating tape 18 is then applied over the exposed braid 15 and whipping 17 and the whole provided with a neoprene cover 19. The procedure employed at the other end of element 10 is determined by quite what is being coupled thereto and may be the same as that illustrated and described when coupling is to another cable. The termination procedure is basically the same as that employed for conventional magnetic minesweep cables, the differences thereover basically being due to the use of tubes rather than solid conductors and the reinforcement in the sheath. In the case of a metallic braid reinforcement of the sheath the termination is modified further in order to ensure no direct contact between the metallic braid and the aluminium termination element and must reliably prevent a water pathway being set up therebetween. FIG. 4 shows a termination for such a metallic braid reinforced sheath cable. The end of element 10 is in this case flanged to provide a seat for a split insulating bush 21 provided thereover. The use of the waterblocking compound, the self-amalgamating tape and the neoprene outer cover prevents set-up of the water pathway. The termination required for an un-reinforced sheath cable is similar to the versions described above but is simpler since there is no braid anchorage requirement. The termination may be used to connect two "bundle of tubes" cables or to connect one "bundle of tubes" cable to other cable configurations, for example to the cork and wood type of conventional mine sweep cable or to copper cadmium cables. In the latter cases the respective end of the termination must be designed appropriately. The illustrated termination element 10 is symmetrical about its longitudinal axis but can be designed in length so that the bores at its ends suit a variety of cable sizes, the bores may be of differing diameters if appropriate.

We claim:

1. A buoyant cable including a bundle of uninsulated electrical conductors substantially comprised by tubes of electrically conductive material, which tubes are sealed at the cable ends, the bundle having an electrically-insulating sheath thereover, the tubes providing buoyancy, strength and electrical conductivity for the cable.

2. A cable as claimed in claim 1 wherein the sheath is internally reinforced.

3. A cable as claimed in claim 2 wherein the sheath is internally reinforced by a non-metallic braid.

4. A cable as claimed in claim 2 wherein the sheath is internally reinforced by a metallic braid.

5. A cable as claimed in claim 1 wherein the sheath is of a buoyant material.

6. A cable as claimed in claim 1 wherein the electrically conductive material is an aluminium alloy.

7. A cable as claimed in claim 1 wherein each tube is substantially neutrally buoyant whereby the cable will float even with a breached sheath.

8. A cable as claimed in claim 1 wherein all of the electrical conductors are comprised by said tubes.

9. A cable as claimed in claim 1 wherein the conductors of the bundle are arranged in layers, the lay thereof being such that the bundle is torsionally balanced.

10. A cable as claimed in claim 1 and terminated at one end by a metallic termination element one end of which is crimped onto the conductor bundle, an insulating layer extending over at least the crimped end of the element and being sealed to the sheath.

11. A cable as claimed in claim 10 wherein the tubes are of an aluminium alloy and the termination element is of aluminium.

* * * * *